(12) United States Patent
Francke et al.

(10) Patent No.: US 6,333,506 B1
(45) Date of Patent: Dec. 25, 2001

(54) X-RAY DETECTOR UNIT WITH SOLID CONVERTER

(75) Inventors: Tom Francke, Sollentuna; Vladimir Peskov, Stockholm, both of (SE)

(73) Assignee: XCounter AB, Danderyd (SE)

( * ) Notice: Subject to any disclaimer, the term of this patent is extended or adjusted under 35 U.S.C. 154(b) by 0 days.

(21) Appl. No.: 09/443,294

(22) Filed: Nov. 19, 1999

(30) Foreign Application Priority Data

Apr. 30, 1999 (SE) .................................................... 9901562

(51) Int. Cl.⁷ .................................................... H01J 47/00
(52) U.S. Cl. .................................................... 250/389
(58) Field of Search .................... 250/214 VT, 214 LA, 250/368, 370.01, 370.09, 591, 369, 389, 580; 378/43

(56) References Cited

U.S. PATENT DOCUMENTS

| | | | |
|---|---|---|---|
| 5,308,987 | 5/1994 | Wuest et al. | 250/374 |
| 5,693,947 | * 12/1997 | Morton | 250/370.09 |
| 6,118,125 | * 9/2000 | Carlson et al. | 250/385.1 |

* cited by examiner

*Primary Examiner*—Georgia Epps
*Assistant Examiner*—Mohammed Hasan
(74) *Attorney, Agent, or Firm*—Birch, Stewart, Kolasch & Birch, LLP

(57) ABSTRACT

A detector unit for two-dimensional detection of incoming radiation from an X-ray source, primarily for use in X-ray radiography. The unit includes a solid material structure (2) having a plurality of passages (6) extending therein and comprising surface portions (7) comprising a conversion medium. The surface portions of the passages are inclined, so that the incoming radiation impinges at an acute angle onto the surface portions. In this way, the efficiency of the detector and the positional resolution are improved.

14 Claims, 10 Drawing Sheets

US 6,333,506 B1

X-RAY DETECTOR UNIT WITH SOLID CONVERTER

FIELD OF THE INVENTION

The invention relates to a detector unit for two-dimensional detection of incoming radiation from an X-ray source. The invention also concerns a solid material structure for use in a detector unit, primarily intended to be used in X-ray radiography, especially for medical imaging.

BACKGROUND OF THE INVENTION

Such a detector unit, which is previously known from U.S. Pat. No. 5,308,987 (Wuest et al) comprises:

a solid material structure including a conversion medium in which incoming radiation causes the emission of electrons into at least one drift region, an anode and cathode for generating an electric field in said at least one drift region, and a detector sensitive in two dimensions adjacent to said solid material structure so as to detect electrons originating from said at least one drift region in response to said incoming radiation.

In the previously knowndetector unit the solid material structure is formed by a solid layer made of a conversion medium. The incoming radiation interacts with the conversion medium and generates electrons which are transported by means of the electric field into an adjacent gas chamber where a detector is located. Normally, secondary electrons are generated in the gas chamber, possibly under avalanche amplification. The detector is coupled to readout electronics.

Accordingly, a two-dimensional detection of the radiation can be accomplished. However, the efficiency of the prior detector unit will not be very high because the absorption probability of the incoming radiation is low, and only a small fraction of the electrons, which are generated in the vicinity of the surface of the conversion medium, will be emitted into the gas chamber.

Also, the low efficiency and a necessarily long absorption length for the radiation in the gas results in the positional resolution being relatively low.

SUMMARY OF THE INVENTION

The present invention improves the efficiency and the positional resolution of a detector unit of the kind stated above.

More particularly, the present invention, is directed to a detector unit, wherein a plurality of passages, arranged in a two-dimensional array, are located close to each other and extend within the solid material structure, said passages having surface portions comprising said conversion medium and being inclined at an angle relative to the direction of the incoming radiation, whereby said incoming radiation will impinge onto said surface portions at an acute angle and cause the emission of electrons directly from said surface portions into said drift regions.

By such a structure, the electrons will be emitted from the same surface portions as those struck by the incoming radiation. The acute angle of impinging X-ray photons will lead to a high efficiency for electrons escaping from the surface. Moreover, some photons will enter into the solid material structure between neighbouring passages, close to one of these passages, and cause the generation of electrons escaping from a neighbouring surface portion into a drift region.

The emitted electrons will thus enter into a gas in the drift region. Here, secondary electrons may be generated by electron avalanche multiplication in the gas, and some of the electrons will also hit other surface portions of the passage and generate further electrons, some of which will escape back into the drift region. Accordingly, a high number of electrons will drift towards the detector, which can be located immediately adjacent to the solid material structure, possibly integrated therewith, or at a distance therefrom.

Thus, the detector is operative in two dimensions and will register the drifted electrons in response to the incoming X-ray photons, with high efficiency and improved positional resolution.

If there is a gap between the solid material structure and the detector, the electrons will be accelerated further and may collide with gas molecules and cause ionization with associated secondary electrons, possibly under avalanche amplification.

In any case, the positional resolution can be maintained at a very high level being determined by the two-dimensional array of passages in the solid material structure.

In one embodiment, the passages are formed by channels in a unitary plate of solid material. The solid material may form the conversion material or, alternatively, be coated with such conversion material on the surface portions of the passages.

In a second embodiment, the solid material structure is constituted by a two-dimensional array of columns with said passages formed therebetween, each column extending from a support plate so as to be held in a fixed position relative to the other columns. The support plate may be located on a front side or on a rear side of the solid material structure, the front side being the side facing the X-ray source.

Preferably, the passages extend from the front side of the solid material structure to a rear side thereof, the detector means being located adjacent to the front or the rear side of the solid material structure. The drift electrodes are then arranged on the front and rear sides, respectively, of the solid material structure so as form drift regions in the passages.

The detector may be constituted by a micropattern gas chamber detector employing avalanche amplification and an arrangement of read-out elements for detection of electron avalanches in said two-dimensional pattern, e.g. of the kind disclosed in the co-pending Swedish applications Nos. 9704015-8, 9901324-5, 9901325-2 and 9901326-0 filed on Apr. 14, 1999.

It is also possible to use a detector of a solid material, e.g. a CCD or TFT detector, e.g. integrated with a support plate for the solid material structure provided with passages.

The invention will now be described more fully with reference to the appended drawings illustrating two preferred embodiments.

BRIEF DESCRIPTION OF THE DRAWINGS

FIGS. 1b and 1c show two modifications of the embodiments of FIG. 1a;

DESCRIPTION OF PREFERRED EMBODIMENTS

Figure 1A:
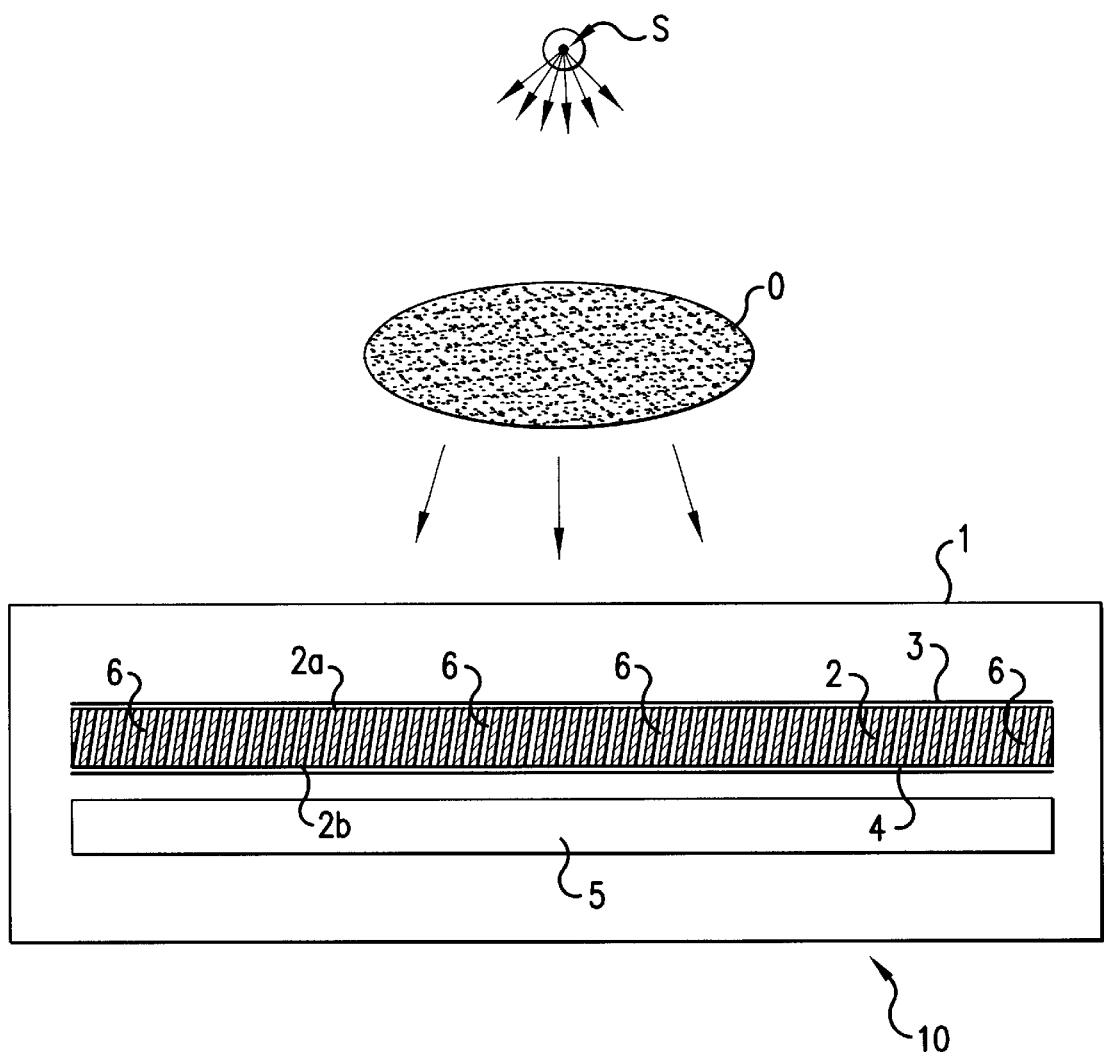
FIG. 1a illustrates schematically a first embodiment of a detector unit according to the invention, and an X-ray source.
Figure 2:
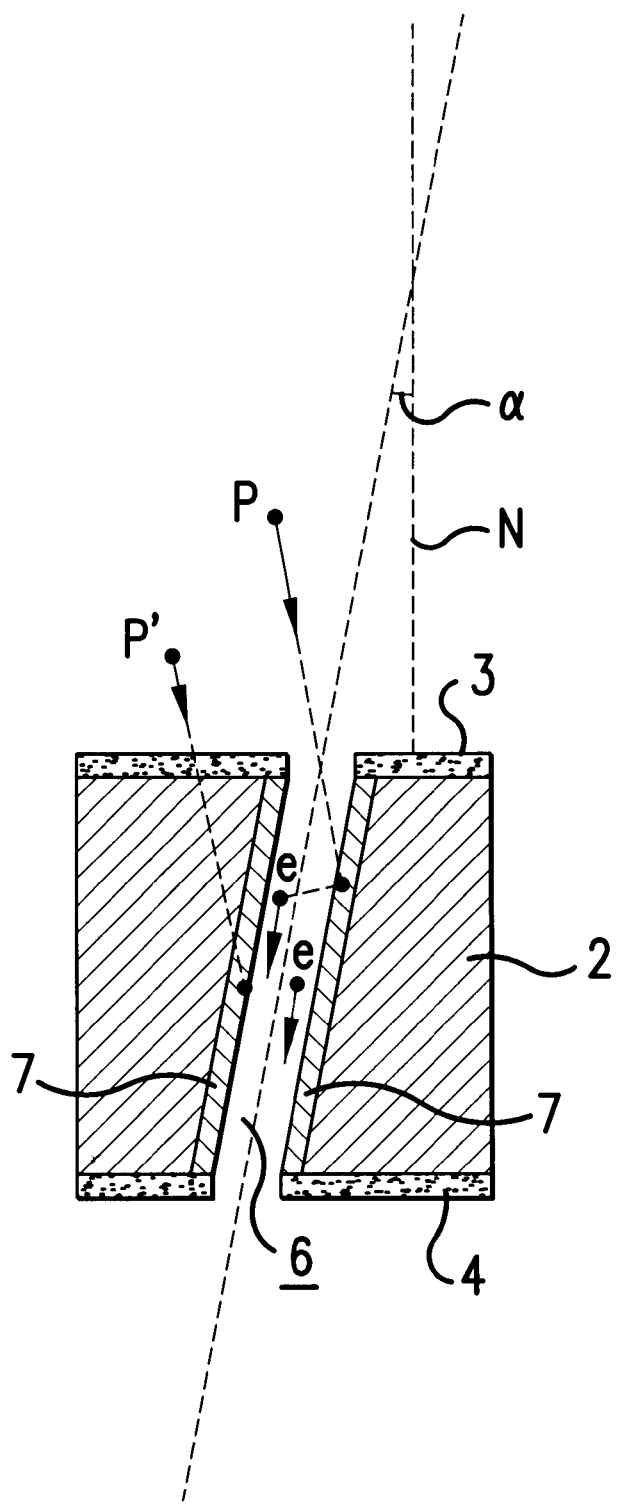
FIG. 2 shows, to a larger scale, a portion of a solid material structure included in the detector unit of FIG. 1.

The detector unit 10 illustrated schematically in FIGS. 1a and 2 includes a frame or housing 1 in which a solid material structure 2, cathode and anode electrodes 3,4 and a detector 5 are disposed. The unit 10 is arranged at a distance from an X-ray source S and an object O to be examined by means of the detector unit 10. The source S and the unit 10 may be mounted in an integral apparatus or separately in relation to each other.

According to the invention, the solid material structure 2 is provided with a plurality of passages 6 illustrated in FIG. 1) arranged in a two dimensional pattern at preferably equal distances from each other in the two dimensions. A typical distance between adjacent passages is 10–1000 μm. Each passage is inclined in relation to the direction of the incoming X-ray photons, whereby the photons P will strike the surfaces of the passages at an acute angle (FIG. 2).

In the embodiment of FIG. 1a, the solid material structure 2 is formed by a plate, e.g., made of KAPTON™ and having a planar front side 2a, facing the source S, and a planar rear side 2b. The passages 6 are constituted by channels or capillaries 6 extending at an inclined angle to a direction N (FIG. 2) being perpendicular to the front side 2a. The channels 6 can be formed in different ways and are, in the illustrated example, made as bores extending in parallel to each other at closely located positions corresponding to the desired two-dimensional pattern in which the examination is to be made.

Each channel 6 is coated with a layer 7 (FIG. 2) of a material having high secondary electron yield, for example CsI. Because of the acute inclinational angle α, which is preferably about 1–30°, in particular 5–20° (in general, this acute angle may be in the range 0.1–45°) and the surface portions coated with the layer 7, a large portion of the incoming X-ray photons P will interact with the CsI material, which constitutes a conversion medium.

Thus, the photons P collide with the conversion medium atoms and cause the generation of electrons "e" very close to the free surfaces of the CsI material. The smaller the angle α is, the closer to the surface the collisions will be and the higher the probability will be that the generated electrons will escape from the surface.

Accordingly, a great number of electrons "e" will reach the surface of the layer 7 and enter into the space within the channel 6. Therefore, the detection efficiency will be high.

The electrodes 3 and 4 generate an electric field therebetween. So, the channels 6 will operate as drift regions and will cause the electrons to travel towards the anode electrode 4, which is possibly constituted by a mesh (as indicated in FIG. 4b for example), and towards the detector 5 illustrated only schematically in the drawing. If necessary, additional electrodes (not shown) can be arranged in order to cause the electrons to accelerate towards the detector 5.

When the electrons "e" escape into the drift region 6, they may collide with other gas molecules and generate further electrons. Some electrons may also hit other parts of the surface 7 and cause collisions and escaping electrons. It should also be noted that some incoming photons (see the photon P' in FIG. 2) will enter the solid material structure between the channels but will nevertheless interact with the surface layer 7 (from "behind") and cause electrons to escape into the drift region. If the walls 2 are thin enough, electrons released in the walls will have a finite probability of escaping into the drift region 6.

The detector 5 may be constituted by any suitable detector which is sensitive in two dimensions, and adaptable to the two-dimensional pattern of the array of passages 6. The detector 5 may be a micropattern detector of solid material or a gaseous detector, e.g. of the kind disclosed in the above-mentioned Swedish patent applications . The detector 5 is coupled to read-out elements and associated electronics (not shown) for processing and output of desired examination data.

Figure 1B:
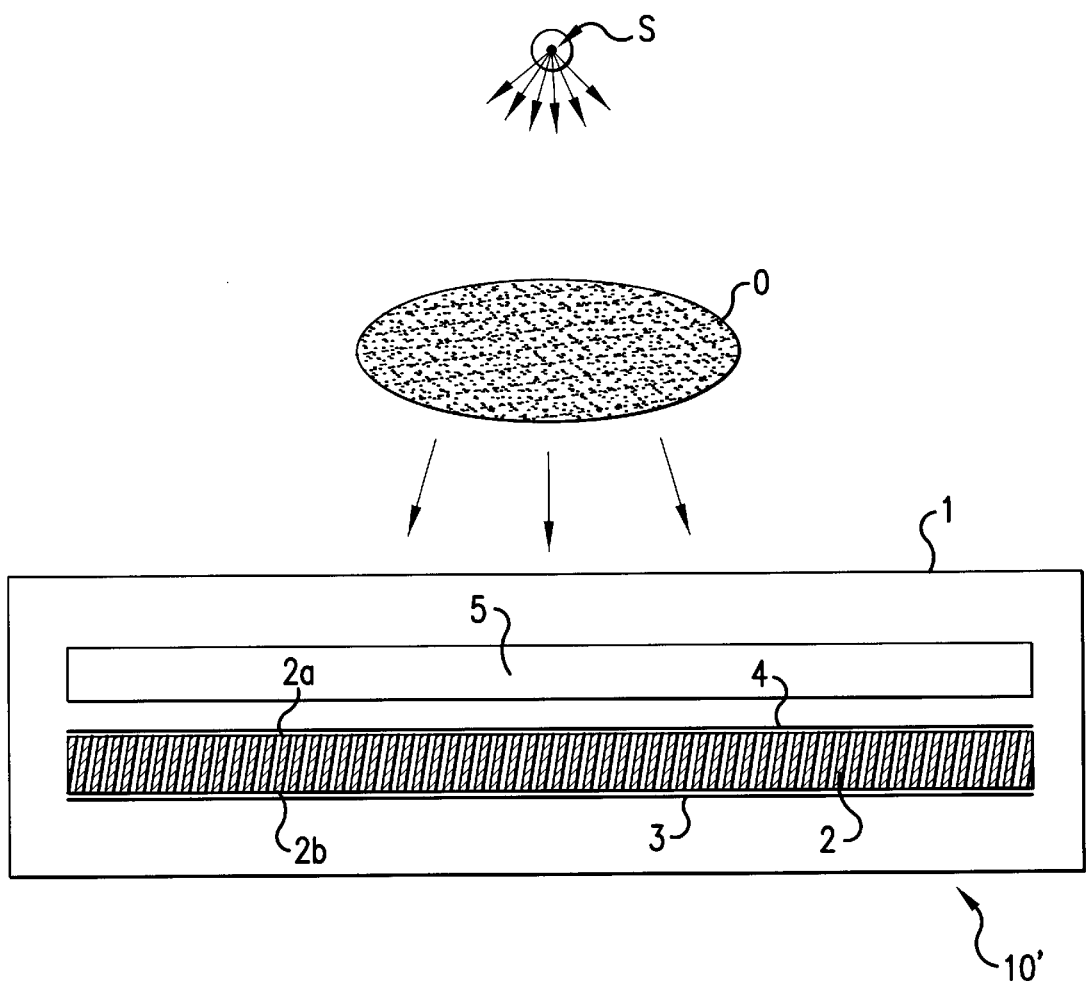
Figure 1C:
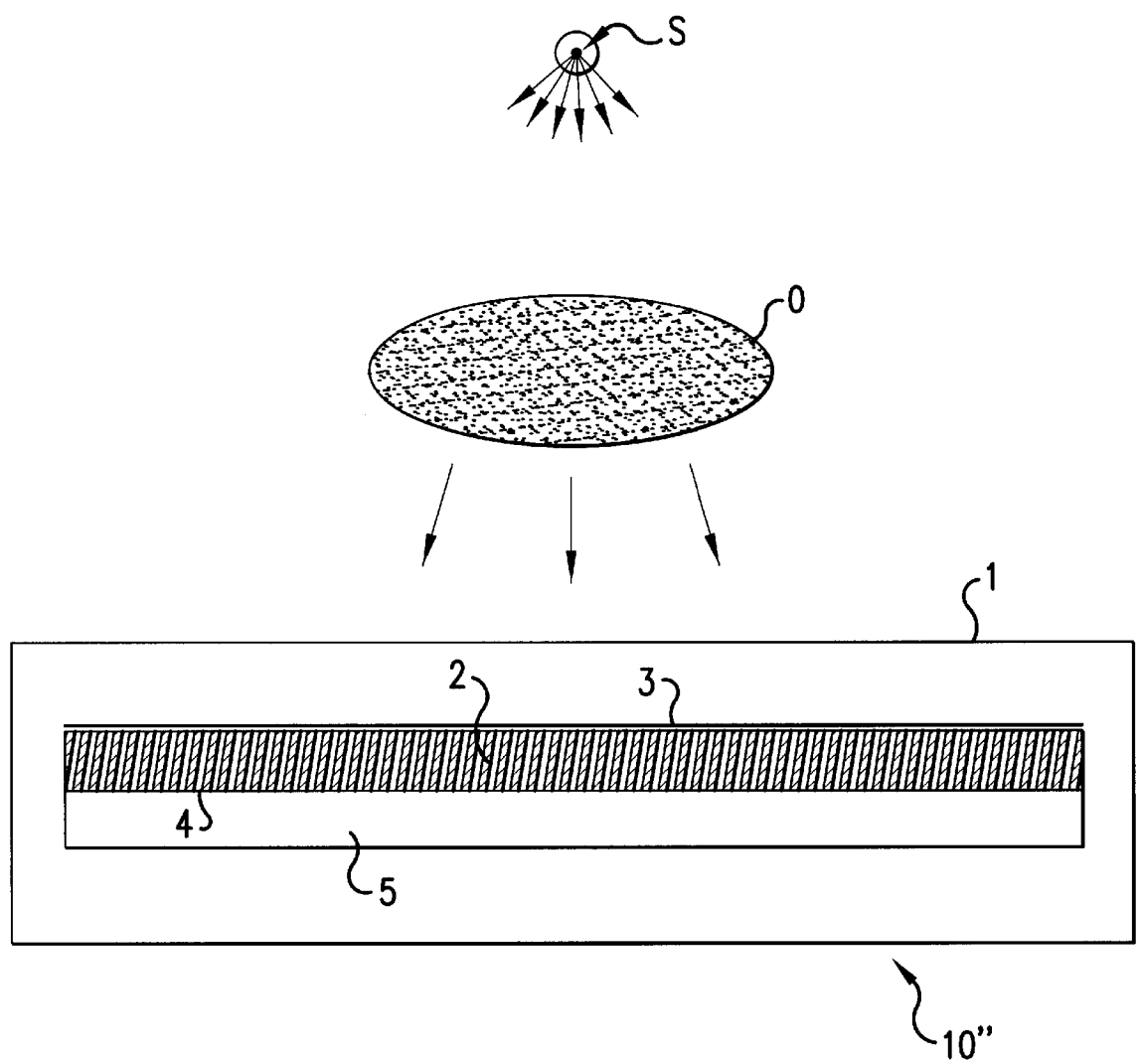

As illustrated in FIGS. 1b and 1c, the detector unit 10 may be modified by locating the detector 5 directly adjacent to the solid material structure 2, without a gap therebetween (detector unit 10", FIG. 1c), or by disposing the detector 5 in front of the solid material structure 2 (detector unit 10', FIG. 1b), with or without a gap therebetween.

Figure 3A:
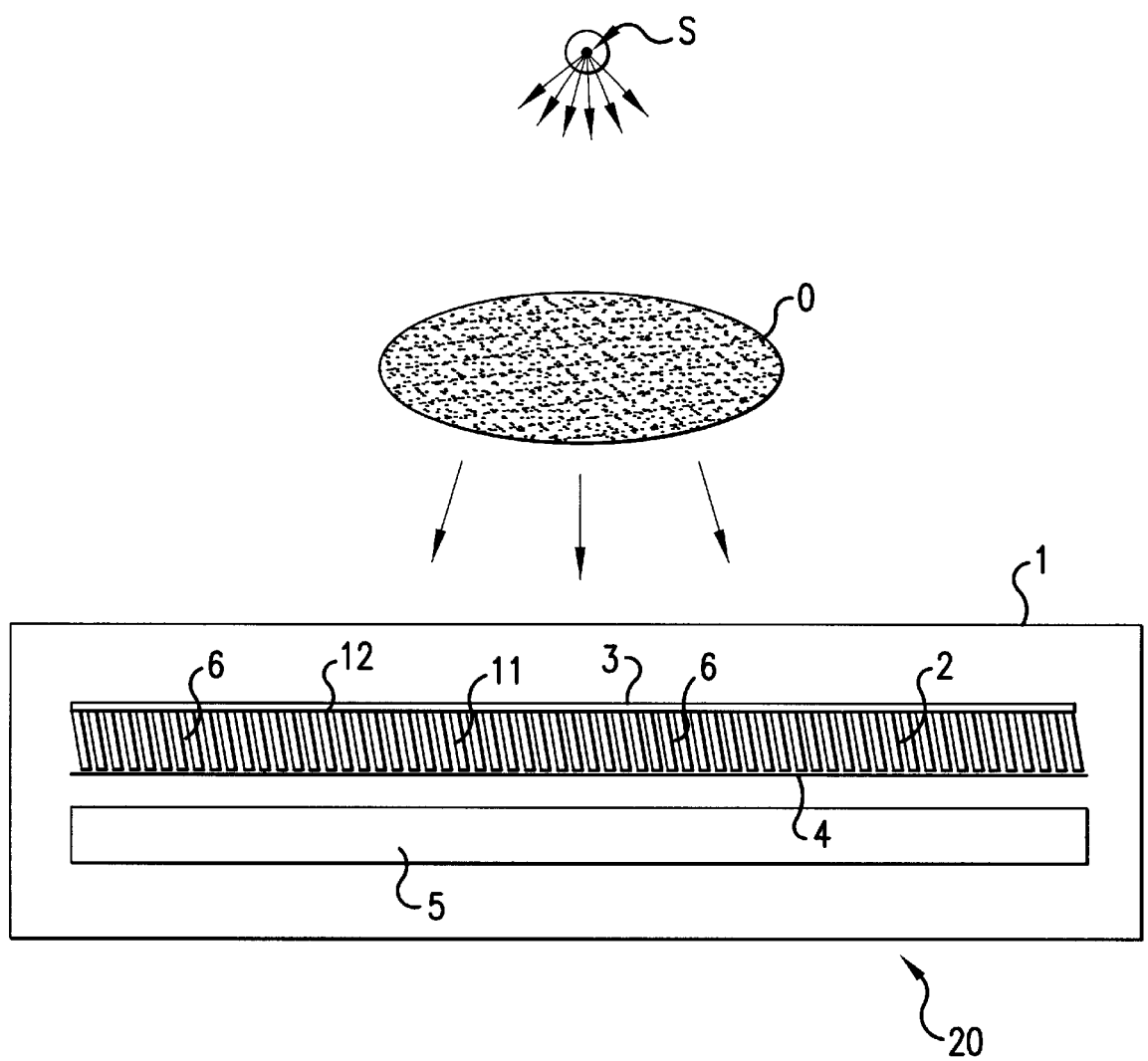
FIG. 3a shows schematically, in a view corresponding to FIG. 1, a second embodiment of a detector unit, and an X-ray source.
Figure 3B:
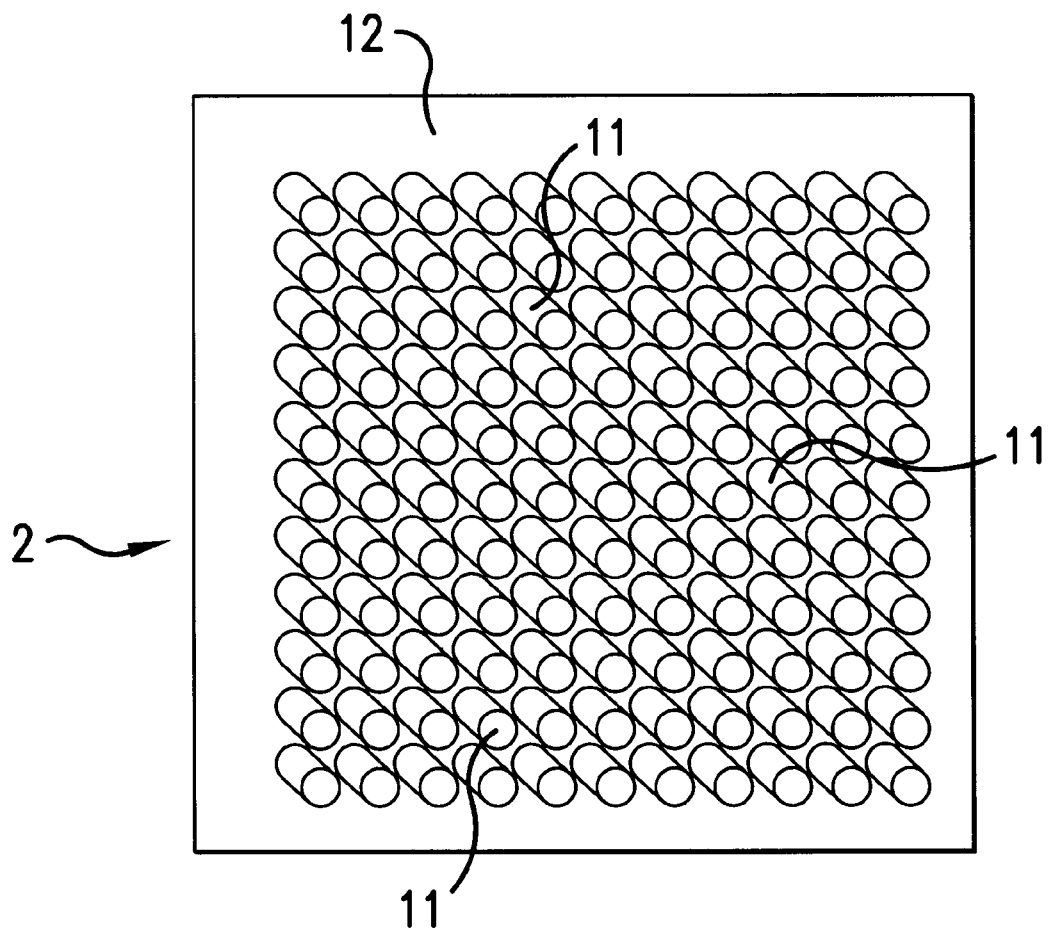
FIG. 3b shows a solid material structure in the detector unit of FIG. 3a, seen from underneath.

The embodiment of the detector unit 20, shown in FIGS. 3a and 3b, differs from the first embodiment primarily in that the passages 6 in the solid material structure 2 are formed between a plurality of inclined columns 11 arranged in a two-dimensional pattern, as will be seen more readily from FIG. 3b which is a view of the structure 2 from underneath.

In this embodiment, the columns 11 are formed in one piece with an upper supporting plate 12, the material thereof being the conversion medium such as, e.g. CsI, or being covered with such a conversion medium. As in the first embodiment, the incoming X-rays will impinge on the inclined surfaces of the conversion medium and will generate electrons which escape from the respective surface portion (of a column 11) into the space between neighbouring columns, said space forming a drift region 6 between electrodes 3 and 4 (FIG. 3a). Accordingly, the electrons will drift towards the detector 5, if necessary by means of a further electrode arrangement.

Figure 4A:
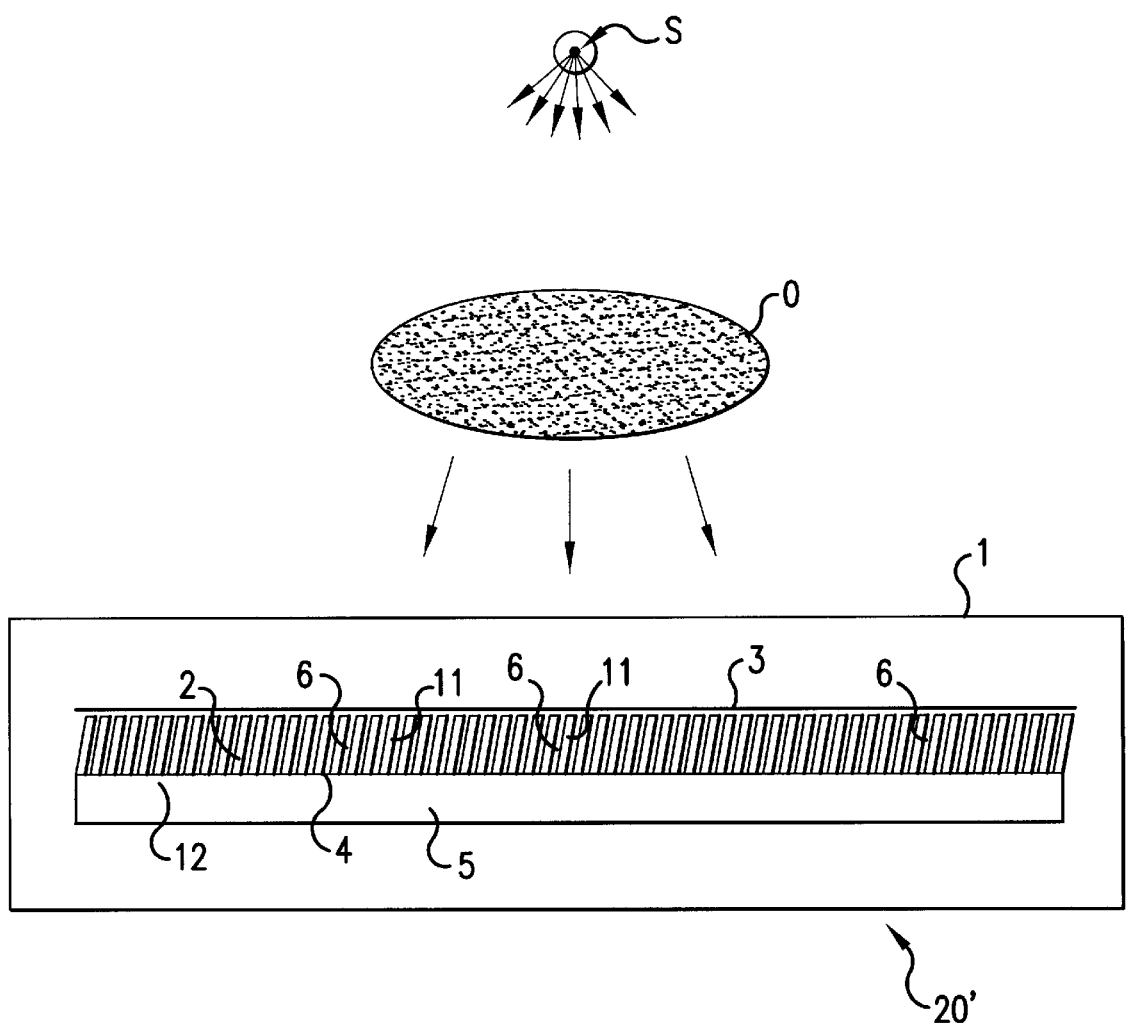
FIGS. 4a and 4b illustrate schematically a first modification of the embodiment of FIGS. 3a and 3b.
Figure 4B:
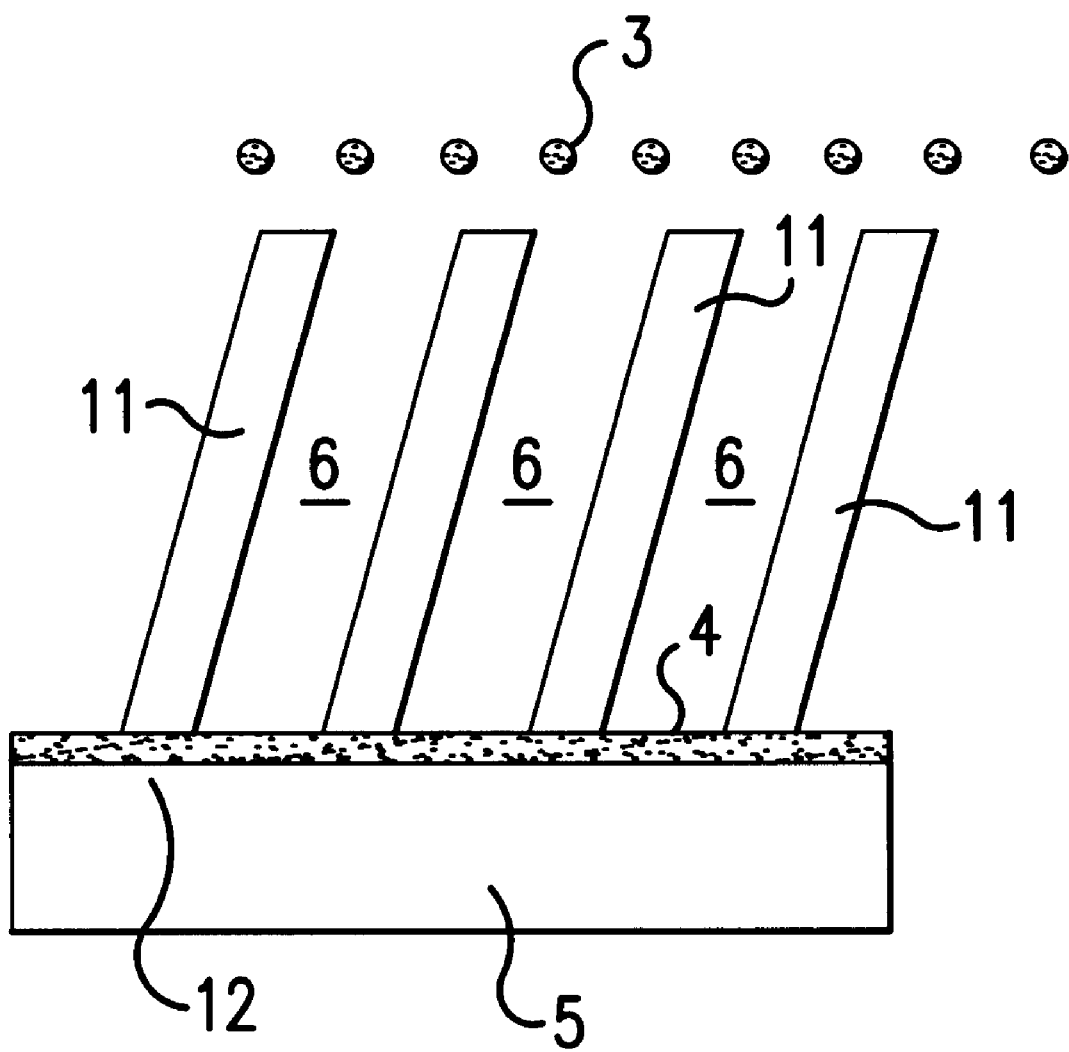

In the modified embodiment of the detector unit 20', shown in FIGS. 4a and 4b, the columns 11 of the solid material structure 2 extend from a lower supporting plate 12, which is integrated with the detector 5 and is provided with an upper coating 4 constituting an anode electrode for accelerating the electrons appearing in the drift regions 6 between the columns 11. In this modified embodiment, the upper electrode is formed by a mesh 3, as indicated in FIG. 4b.

Figure 5A:
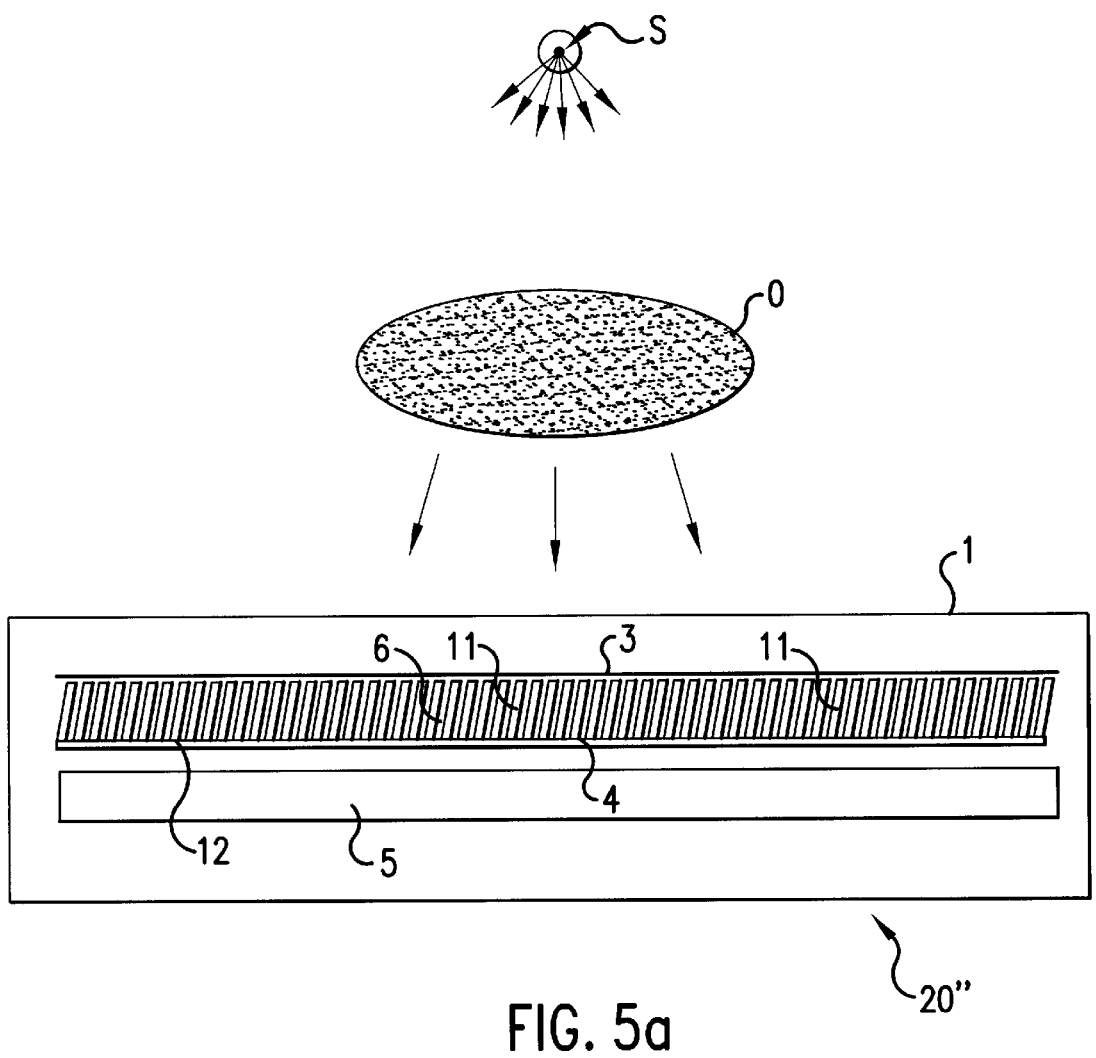
FIGS. 5a and 5b illustrate schematically a second modification of the embodiment of FIGS. 3a and 3b.
Figure 5B:
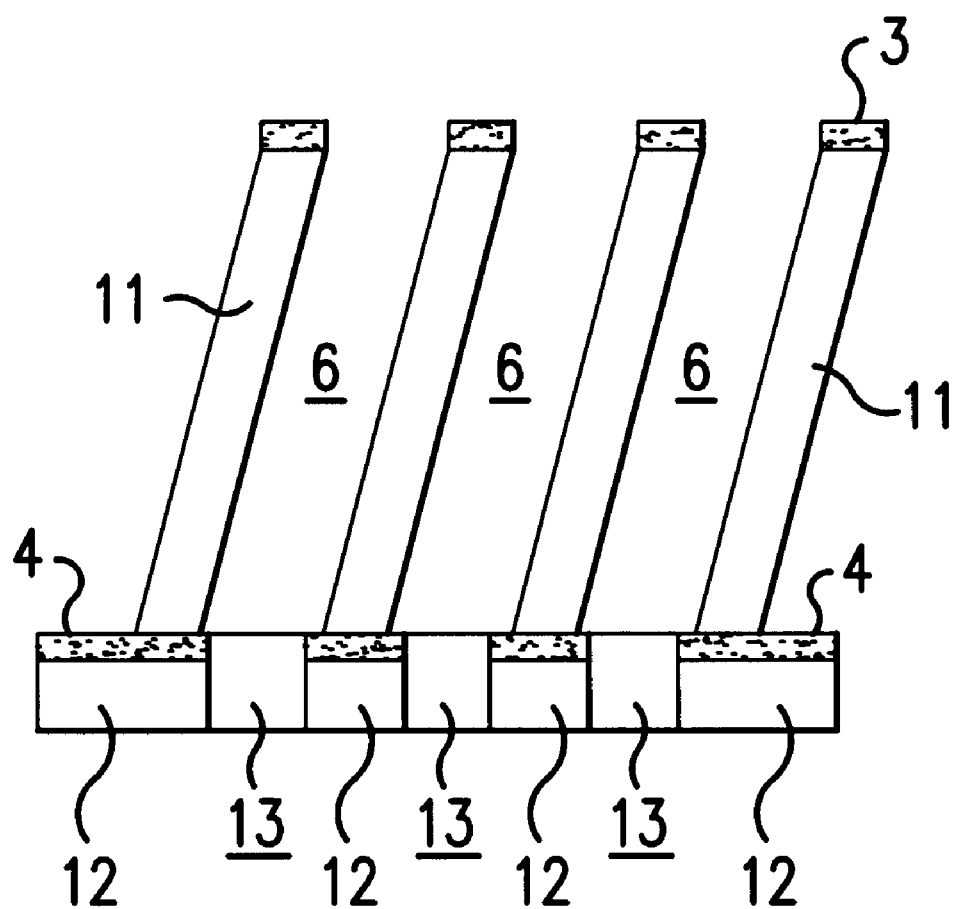

The second modification of the detector unit 20", illustrated in FIGS. 5a and 5b, is very similar to the one shown in FIGS. 4a and 4b, except for the fact that there is a gap between the supporting plate 12 and the detector 5. Also, the upper electrode is formed by a coating 3 on the upper surfaces of the columns 11, and there are through holes 13 in the supporting plate 12 adjacent to each passage 6, in order to allow the electrons to pass from the drift regions 6 toward the detector 5.

From the aforegoing description, it will be apparent that an important feature of the invention is that the solid material structure should have such a configuration that the X-ray photons will impinge on a plurality of surface portions at an acute angle so as to ensure a high probability of collisions close to the surface and the escape of electrons from the surface. Of course, such an inclinational angle may be secured alternatively by letting the X-rays hit the solid material structure 2 at an inclined angle, at all portions of the front side facing the source S, and having the passages 6 oriented perpendicular to the front side surface 2a (α=0° in FIG. 2).

Those skilled in the art can modify the exact configuration of the solid material structure and other parts of the detector unit within the scope defined by the appended claims. In particular, the detector means 5 may be of any suitable kind, either in the form a solid material or comprising a gas chamber.

What is claimed is:

1. A detector unit for two-dimensional detection of incoming radiation from an X-ray source, comprising:
   a solid material structure including a conversion medium in which said incoming radiation causes the emission of electrons into at least one drift region,
   an anode and cathode for generating an electric field in said at least one drift region, and
   a detector sensitive in two dimensions adjacent to said solid material structure so as to detect electrons originating from said at least one drift region in response to said incoming radiation, wherein
   a plurality of passages, arranged in a two-dimensional array, are located close to each other and extend within the solid material structure,
   the passages having surface portions including the conversion medium and being inclined at an angle relative to the direction of the incoming radiation,
   whereby said incoming radiation will impinge onto said surface portions at an acute angle and cause the emission of electrons from said surface portions into said drift regions.

2. A detector unit as defined in claim 1, wherein said passages are inclined at an angle of 0.1–45° relative to a direction (N) perpendicular to a front side of said solid material structure.

3. A detector unit as defined in claim 1, wherein the inclinational angle is 1–30°.

4. A detector unit as defined in claim 3, wherein the inclinational angle is 5–20°.

5. A detector unit as defined in claim 1, wherein the passages, at least in the region of a front side of said solid material structure, are perpendicular to said front side, whereas the direction of said incoming radiation is inclined at an angle of 0.1–45° relative to the passages.

6. A detector unit as defined in claim 1, wherein the passages are constituted by channels formed in a unitary plate of solid material.

7. A detector unit as defined in claim 1, wherein the passages are constituted by spaces formed between neighbouring columns (11) arranged in a two-dimensional array, said columns being unitary with a supporting plate.

8. A detector unit as defined in claim 1, wherein the passages extend from a front side to a rear side of said solid material structure.

9. A detector unit as defined in claim 1, wherein said detector is located adjacent to a rear side of the solid material structure.

10. A detector unit as defined in claim 1, wherein said detector is located adjacent to a front side of the solid material structure.

11. A detector unit as defined in claim 1, wherein there is a gap between the solid material structure and the detector.

12. A detector unit as defined in claim 1, wherein said detector is located immediately next to said solid material structure.

13. A detector unit as defined in claim 1, wherein said anode and cathode are arranged on the front and rear sides, respectively, of the solid material structure so as to establish said drift regions in said passages.

14. A solid material structure for use in a detector unit having a plurality of passages, arranged in a two-dimensional array, extending within the solid material structure, passages having surface portions including a conversion medium for converting incoming radiation from an X-ray source, impinging at an acute angle onto the surface portions, into electrons, some of which will escape into the passages so as to be available for two-dimensional detection in response to the incoming radiation.

* * * * *